United States Patent

Kawagoe et al.

[11] Patent Number: 5,265,335
[45] Date of Patent: Nov. 30, 1993

[54] FORMING METHOD OF BUSHING WITH INNER SLIDING SURFACE

[75] Inventors: Hideharu Kawagoe; Takayuki Shibayama; Yoshitaka Kondo, all of Nagoya; Motoji Komori, Gifu, all of Japan

[73] Assignee: Daido Metal Company Ltd., Nagoya, Japan

[21] Appl. No.: 984,547

[22] Filed: Dec. 2, 1992

[30] Foreign Application Priority Data

Jan. 31, 1992 [JP] Japan .................. 4-016517

[51] Int. Cl.⁵ .................. F16C 33/14; B21D 53/00
[52] U.S. Cl. .................. 29/898.058; 29/898.059; 72/352; 72/368; 72/700
[58] Field of Search .................. 29/898.054, 898.056, 29/898.057, 898.058, 898.059; 72/344, 352, 355.4, 368, 377, 378, 700

[56] References Cited

U.S. PATENT DOCUMENTS

| | | | |
|---|---|---|---|
| 2,198,074 | 4/1940 | Berry | 29/898.059 |
| 2,289,572 | 7/1942 | Underwood | 29/898.059 X |
| 2,338,858 | 1/1944 | Lignian | 29/898.058 |
| 2,722,047 | 11/1955 | Cousino | 29/898.056 |
| 4,048,703 | 9/1977 | Lehnart | 29/898.057 |
| 4,122,701 | 10/1978 | Lehnart | 72/355.4 |

FOREIGN PATENT DOCUMENTS

| | | | |
|---|---|---|---|
| 1185900 | 1/1965 | Fed. Rep. of Germany | 72/367 |
| 137412 | 9/1979 | Fed. Rep. of Germany | 72/367 |
| 732249 | 6/1955 | United Kingdom | 29/898.058 |

*Primary Examiner*—Mark Rosenbaum
*Assistant Examiner*—S. Thomas Hughes
*Attorney, Agent, or Firm*—Browdy and Neimark

[57] ABSTRACT

An inner sliding surface layer of a bearing bushing is formed into a crowning shape in an axial direction by a die shaping method. A bushing blank fitted on a generally-tapered lower end portion of an upper mandrel is inserted, together with the upper mandrel, into a hole in a forming die, and the bushing blank is deformed between the forming die, the upper mandrel and a lower mandrel having an upper end portion similar in shape to the lower end portion of the upper mandrel, thereby obtaining the bushing having the sliding inner peripheral surface of a crowning shape.

4 Claims, 2 Drawing Sheets

FORMING METHOD OF BUSHING WITH INNER SLIDING SURFACE

BACKGROUND OF THE INVENTION

This invention relates to a method of forming or shaping a bearing bushing having an inner sliding surface used in various kinds of machines, such as an automobile, an industrial machine and an agricultural machine, and more particularly to a bushing used in that portion of such a machine which is liable to receive an impact load and an uneven load.

For example, a bushing, mounted as a bearing member in a shock absorber provided at a front fork of a motorcycle, receives an impact at the time of start of the motorcycle, and also is greatly influenced by undulations on the road during running of the motorcycle. Thus, due to vibrations transmitted via wheels at the time of the start and during running, as well as bending of an inner tube (or a shaft) slidably engaged within the bushing, it is desirable that the sliding surface of the bushing should be formed into a crown or crowning shape so that the impact load and the even load can be absorbed or alleviated.

There are known methods of providing a crown or crowning shape to an inner peripheral surface of a bushing so that the inner diameter of the bushing is larger at its opposite longitudinal or axial ends, and decreases progressively toward the central zone of the bushing. In one such known method, a circular internal hole of a housing in which a bushing is to be mounted is machined into a smaller diameter at its axial central zone, and also is machined into a larger diameter at its opposite end zones, and then the bushing is inserted into the housing, and subsequently the bushing is expanded and deformed into conformity with the peripheral surface of the circular internal bore hole of the housing. In another such known method using expensive machining, only those zones of an inner peripheral surface of a bushing adjacent to opposite ends of the bushing are machined to provide a crowning shape to the inner peripheral surface.

SUMMARY OF THE INVENTION

Thus, it is an object of this invention to provide a bushing forming method in which a bushing can be formed in an easy manner without the need for a cumbersome and expensive operation such as the machining of the bushing, after the bushing is set in a working apparatus.

According to the present invention, there is provided a bushing forming method wherein a crowning shape is provided to an inner peripheral surface of a bushing so that the inner diameter of the bushing is larger at its opposite longitudinal or axial ends, and decreases progressively toward a longitudinal central zone of the bushing, the method comprising the steps of:

(a) fitting a cylindrical bushing blank on a lower end portion of a vertically-movable upper mandrel, the outer diameter of the upper mandrel being smaller at its lower end zone, and increasing progressively away from the lower end;

(b) inserting the upper mandrel and the bushing blank attached to the upper mandrel into a central hole and from an upper side of a stationary forming die, the latter of which is coaxial with the upper mandrel, while bringing the upper mandrel with the bushing blank and a vertically-movable lower mandrel, which is coaxial with the upper mandrel and the forming die and which is inserted into the central hole of the forming die from a lower side, toward each other and plastically deforming said bushing blank between the upper- and the lower-mandrels and the forming die, an upper end portion of the lower mandrel being identical or similar in shape to the lower end portion of the upper mandrel; and (c) vertically moving the upper- and the lower-mandrels to remove the bushing from the forming die.

In the above step (c), for example, the upper mandrel is moved upwards away from the die, and subsequently the lower mandrel is moved upwards. Thus, the bushing is removed from the die at a position above a top surface of the die.

Herein, the terms "upper" and "lower" are used merely to indicate the relative position between the two mandrels by way of example, and are not intended to limit the direction of the mandrels.

Preferably, the cylindrical bushing blank comprises an outer backing metal of an outer peripheral layer (which is made of steel, for example) and an inner peripheral layer formed of bearing alloy on an inner side of the backing metal. In usual, the outer backing metal and the inner peripheral layer (bearing alloy layer) are integrally bonded together through an intermediate bonding layer by rolling. Typically, a steel sheet and a bearing alloy sheet are superposed together with an intermediate bonding sheet interposed therebetween, and the superposed sheets are rolled into an integral structure. The obtained laminate is cut into a predetermined size, and then is bent or curled into a cylindrical shape with opposite ends butted together, thereby producing a bushing blank (which is usually referred to as "cylindrically-bent bushing").

DESCRIPTION OF THE PREFERRED EMBODIMENTS

A preferred embodiment of the present invention will now be described with reference to FIGS. 1 to 3.

Figure 1:
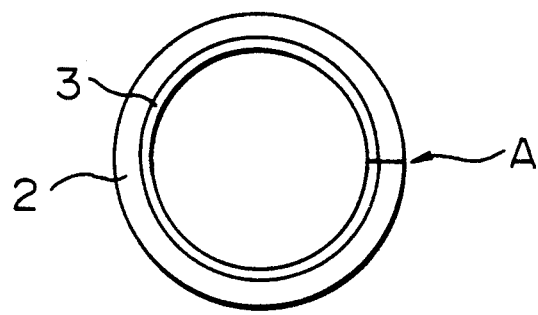
FIG. 1 is an end view of a cylindrical bushing blank.
Figure 2:
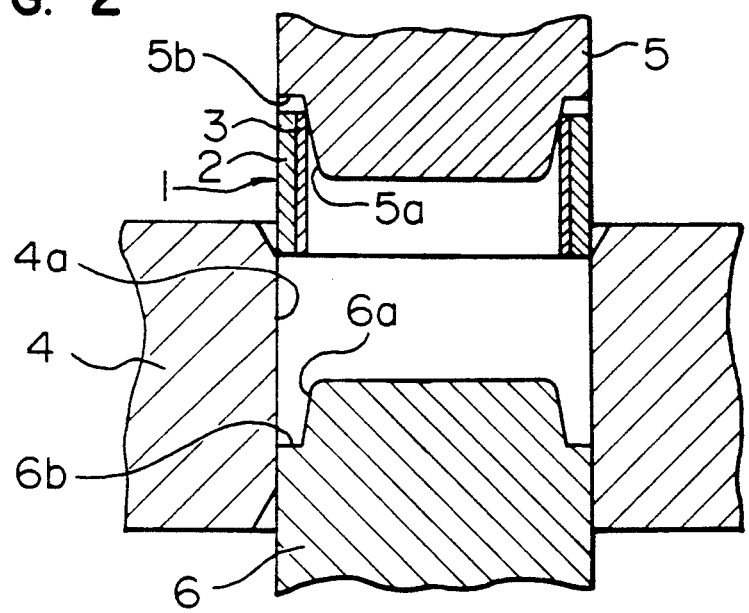
FIG. 2 is a cross-sectional view of a forming apparatus, showing a forming operation-ready condition in which the cylindrical bushing blank is attached to an upper mandrel.
Figure 3:
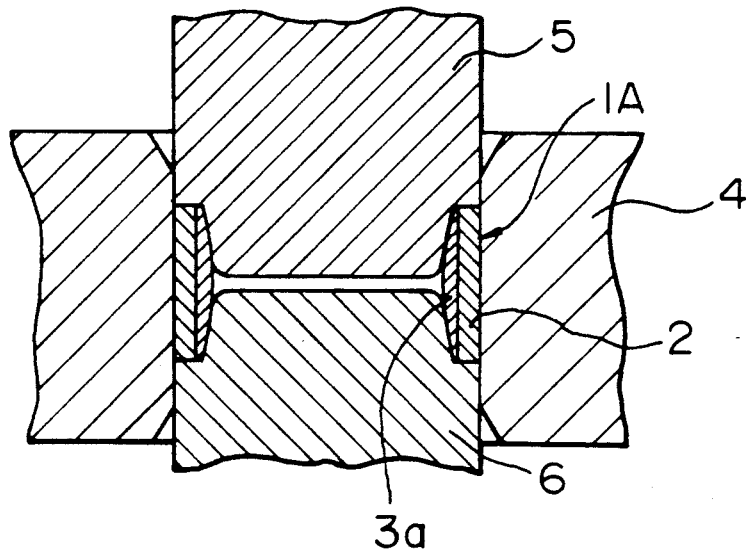
FIG. 3 is a cross-sectional view of the forming apparatus, showing a condition in which the bushing blank is formed into a bushing.

A bushing blank 1 shown in FIGS. 1 and 2 is formed by bending a blank plate into a cylindrical shape, with the opposite ends of the blank plate butt joined together as at A in FIG. 1. The bushing blank 1 comprises an outer backing metal 2 and an inner bearing alloy layer 3. For shaping or processing the bushing blank 1, the bushing blank 1 is first fitted on a power end portion (distal end portion) of a vertically-movable upper mandrel 5. The outer diameter of the upper mandrel 5 is smaller at its lower end, and increases progressively away from the lower end, so that the upper mandrel 5 has a lower end portion 5a of a frustum-conical shape. A step or shoulder 5b is formed at a proximal end of the frustum-conical portion. The step 5b functions as a stopper for preventing the movement of the bushing blank 1 relative to the upper mandrel when shaping the bushing blank 1. The upper mandrel 5, except for its lower end portion, has an outer diameter slightly smaller but generally equal to the diameter of a central forming hole 4a of a forming die 4 disposed beneath the upper mandrel 5 which is coaxial with the forming die. The width of the step or shoulder 5b is, as seen in FIGS. 2 and 3, at least equal to the thickness of the backing layer 2. In addition to the upper mandrel 5, a lower mandrel 6 is used, which is coaxial with the upper mandrel and the forming die. More specifically, the lower mandrel 6 has an upper end portion (distal end portion) generally similar in shape to the lower end portion of the upper mandrel 5, and the lower mandrel 6, except for its upper end portion, has an outer diameter slightly smaller but generally equal to the diameter of the central forming hole 4a in the forming die 4. The lower mandrel 6 has a frustum-conical portion 6a and a step or shoulder 6b of shape and size similar to step 5b.

After the lower mandrel 6 is inserted into the forming hole 4a of the forming die 4, the upper mandrel 4 carrying the bushing blank 1 is inserted into the forming hole 4a. The bushing blank 1 is urged by the step 5b of the upper mandrel 5, and is brought into abutting engagement with the step 6b of the lower mandrel 6, as shown in FIG. 3. The two mandrels are moved toward each other until the distance between the steps 5b and 6b coincides with the axial length of the bushing blank 1. As a result, the backing layer 2 is not acted on and only the bearing alloy layer 3 of the bushing blank 1 is plastically deformed, and is formed into a shape determined by the two frustum-conical portions 5a and 6a. The distal end portions of the two mandrels 5 and 6 impart a crowning shape to the inner peripheral surface of the thus formed bushing 1A which serves as a sliding surface. Namely, the inner peripheral surface of the resultant bushing 1A is curved, and the central portion of the bushing 1A is greater in thickness at its central zone than at its opposite end zones, but the overall axial length of the bushing is unchanged as is seen from the drawings. The forming method is usually called "ironing".

After the above forming operation is completed, the upper mandrel 5 is moved upwards to be withdrawn from the forming hole 4a in the forming die 4. Next, the lower mandrel 6 is moved upwards to bring the bushing 1A to a position above the upper surface of the forming die 4, and the bushing 1A is removed from the lower mandrel 6. The order of the steps of this forming method is not limited, and these steps may be performed in a most efficient way.

Referring to one example of method of producing the bushing blank 1, powder of bronze is sintered to form a porous lining on a backing metal of steel, and thereafter Teflon (polytetrafluoroethylene) and lead, both of which are in the form of powder, are impregnated together with a solvent in the above porous lining layer, and are coated on the surface to provide a composite plate (JP-B1-39-16950), and the composite plate is bent into a cylindrical shape to provide the bushing blank, as described above. In another example, a composite plate composed of a steel backing metal and a lead-bronze alloy layer is formed into a cylindrical shape in the manner described above to thereby provide the bushing blank. Referring to one example of the size of the bushing 1A, the bushing has an inner diameter of 12 mm, an outer diameter of 14 mm and a width (axial length) of 10 mm. In another example, the bushing 1A has an inner diameter of 68 mm, an outer diameter of 73 mm and a width of 30 mm.

FIGS. 4 to 8 show examples of bushings each having a sliding surface at its inner periphery. Each bushing is fitted in a tubular member 7 serving as a housing, and a bearing comprising the layers 2 and 3b-3f is fitted in a tubular member 7 serving as a housing, with the bearing alloy layer being at the inner periphery of the bushing where it is held in sliding contact with an outer peripheral surface of a shaft 8 which is telescopically engaged in the tubular member 7 with the bushing.

Figure 4:
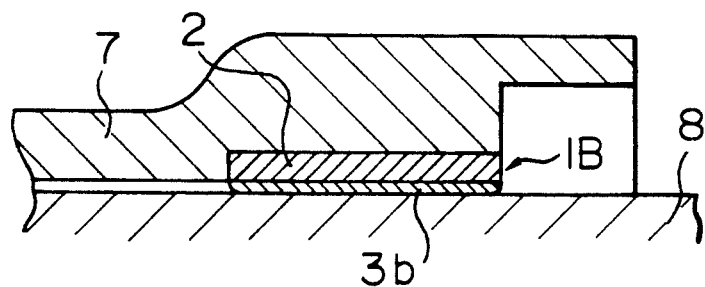
FIGS. 4 to 8 are cross-sectional views showing various kinds of bushings having their respective bearing alloy layers having different crowning shapes, each of which is engaged in a tube.
Figure 5:
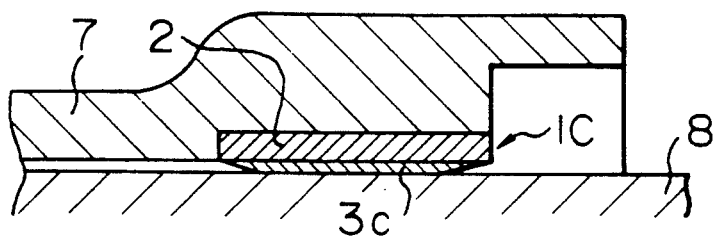
Figure 6:
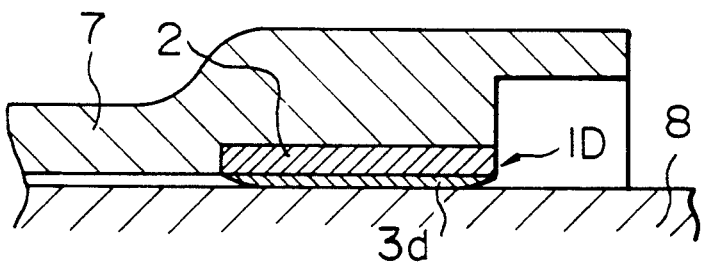
Figure 7:
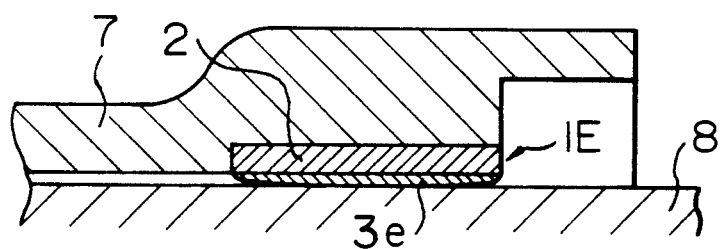
Figure 8:
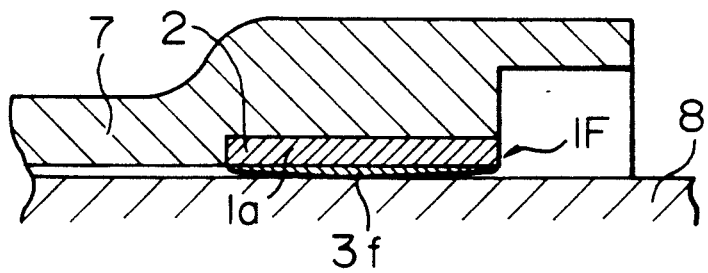

The bearing alloy layer 3b of the bushing 1B shown in FIG. 4 is chamfered over a small region at each of the opposite ends of the inner peripheral surface thereof, so that the inner peripheral surface of the bushing assumes a curved or inclined configuration. Such configuration is also construed as a crowning shape of the inner peripheral surface in the present invention.

The bearing alloy layers 3c, 3d, 3e and 3f of the bushings 1C, 1D, 1E and 1F shown respectively in FIGS. 5 to 8 have respective crowning shapes slightly different from one another.

As will be apparent from the above. the bushing forming method of the present invention, the bushing blank is shaped by the die in such a manner that the inner surface serving as the bearing surface is formed into the crowning shape in the axial direction, without deforming the backing metal and without substantial change in the axial length of the bushing blank. Therefore, the bushing can be smoothly mounted into the housing, and besides an improved dimensional precision of the minimum inner diameter-portion can be expected. Moreover, since there is no need to remove the opposite end portions of the bushing by machining, there is no fear that chips produced by such machining operation deposit on the sliding surface of the bushing. Therefore, the present invention can provide the crowning shape advantageous over that obtained with the prior art.

What is claimed is:

1. A method of forming a bushing having a crowning shape on an inner peripheral sliding surface thereof so that the inner diameter of the bushing is larger at its opposite longitudinal ends, and decreases progressively toward a central zone of the bushing, the method comprising the steps of:
   (a) fitting a cylindrical bushing blank comprising an inner peripheral bearing alloy and an outer backing metal layer on a lower end portion of a vertically movable upper mandrel, the outer diameter of said upper mandrel being smaller at its lower end zone, and increasing progressively away from said lower end zone;
   (b) inserting the upper mandrel and the bushing blank attached to the upper mandrel into a central hole of a stationary forming die from an upper side thereof, which is coaxial with the upper mandrel, while bringing the upper mandrel with the bushing blank and a vertically movable lower mandrel, which is coaxial with the upper mandrel and the forming die and which is inserted into the central hole of the forming die from a lower side, as to relatively approach each other thereby plastically deforming said inner peripheral bearing alloy layer of said bushing blank between the upper and the lower mandrels and the forming die thereby achieving said crowning shape without any deformation of the outer backing metal layer and without any substantial change in the axial length of said bushing blank, an upper end portion of the lower mandrel being identical or similar in shape to the lower end portion of the upper mandrel; and (c) vertically moving said upper and lower mandrels to remove the bushing from said forming die.

2. A bushing forming method according to claim 1, wherein said backing metal is steel.

3. A bushing forming method according to claim 1, wherein said step (c) comprises moving said upper mandrel upwards away from said die, subsequently moving said lower mandrel upwards, and removing the bushing from said die at a position above a top surface of said die.

4. A method of forming a bushing having a crown along an inner peripheral sliding surface thereof so that the inner diameter of the bushing is larger at its opposite longitudinal ends, and decreases progressively toward a central zone of the bushing, the method comprising the steps of:

(a) fitting a cylindrical bushing blank comprising an inner peripheral bearing alloy and an outer backing metal layer on a lower end portion of a vertically movable upper mandrel having a curved shaping surface and shoulder with a width at least as great as the thickness of said outer backing metal layer, the outer diameter of said upper mandrel being smaller at its lower end zone, and increasing progressively away from said lower end zone;

(b) inserting the upper mandrel and the bushing blank attached to the upper mandrel into a central hole of a stationary forming die from an upper side thereof, which is coaxial with the upper mandrel, while bringing the upper mandrel with the bushing blank and a vertically movable lower mandrel, which has an upper end portion identical or similar in shape to the lower end portion of the upper mandrel and is coaxial with the upper mandrel and the forming die and which has a curved shaping surface and a shoulder having a width which is at least as great as the thickness of said outer metal backing layer, said movable lower mandrel being inserted into the central hole of the forming die from a lower side, as to relatively approach each other thereby plastically deforming said inner peripheral bearing alloy layer of said bushing blank between said curved shaping surfaces of the upper and the lower mandrels and the forming die thereby shaping said crown without causing deformation of the outer backing metal layer between said shoulders and without any substantial change in the axial length of said bushing blank; and (c) vertically moving said upper and lower mandrels to remove the bushing from said forming die.

* * * * *